July 22, 1969 R. H. ASENDORF 3,457,552

ADAPTIVE SELF-ORGANIZING PATTERN RECOGNIZING SYSTEM

Filed Oct. 24, 1966 5 Sheets-Sheet 1

Robert H. Asendorf,
INVENTOR.
BY.
J. K. Haskell
ATTORNEY.

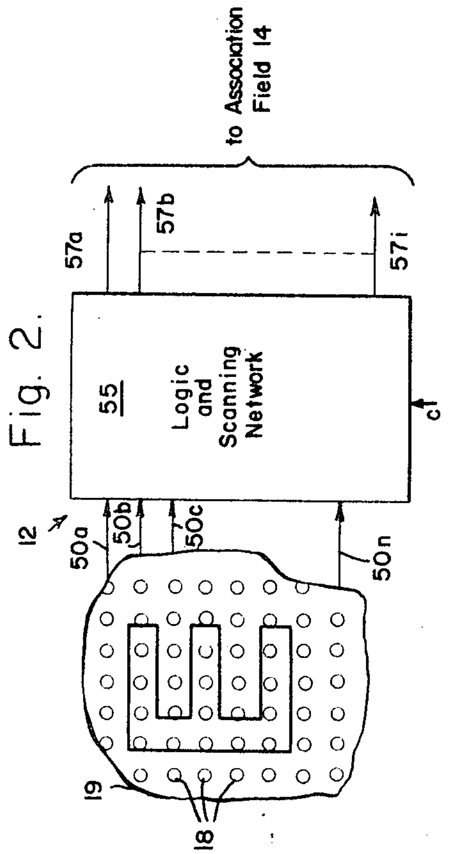
Fig. 2.
| Pattern | Z1 | Z2 | Z3 | Z4 |
|---|---|---|---|---|
| X1 | Max. | | | |
| X1+X2 | Max. | | | |
| X1+X2+X3 | Max. | | | |
| X1···X4 | | | Max. | |
| X1···X5 | | | Max. | |
| X1···X6 | Max. | | | |
| X1···X7 | Max. | | | |
| X1···X8 | | | | Max. |
| X1···X9 | Max. | | | |
| X1···X10 | | | | |
Fig. 12.
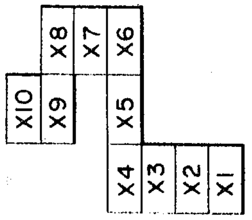
Fig. 11.
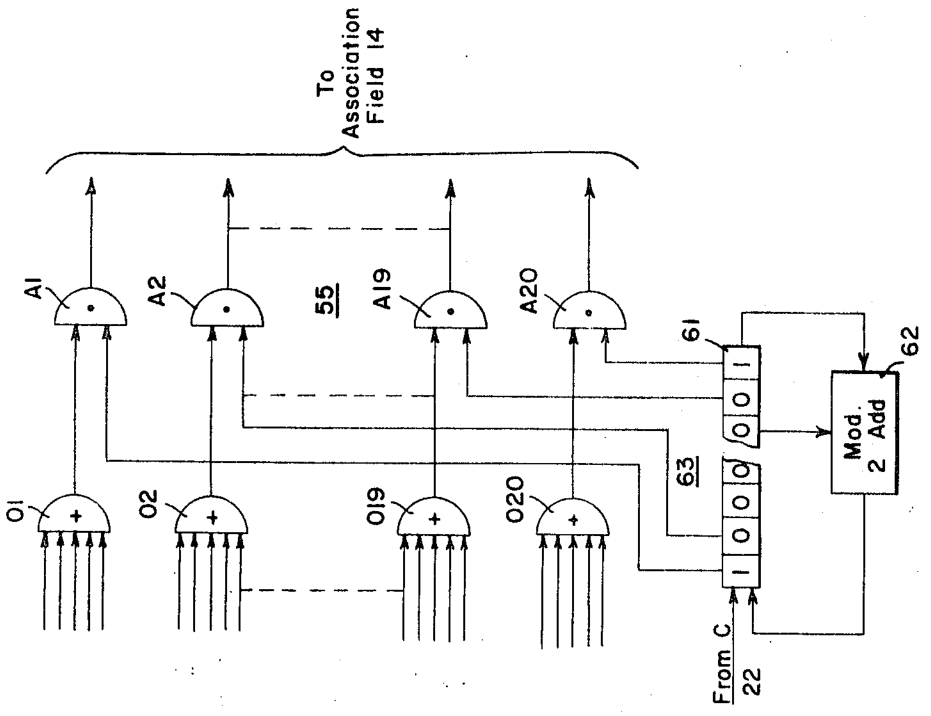
Fig. 3.

ADAPTIVE SELF-ORGANIZING PATTERN RECOGNIZING SYSTEM
Filed Oct. 24, 1966 5 Sheets-Sheet 3
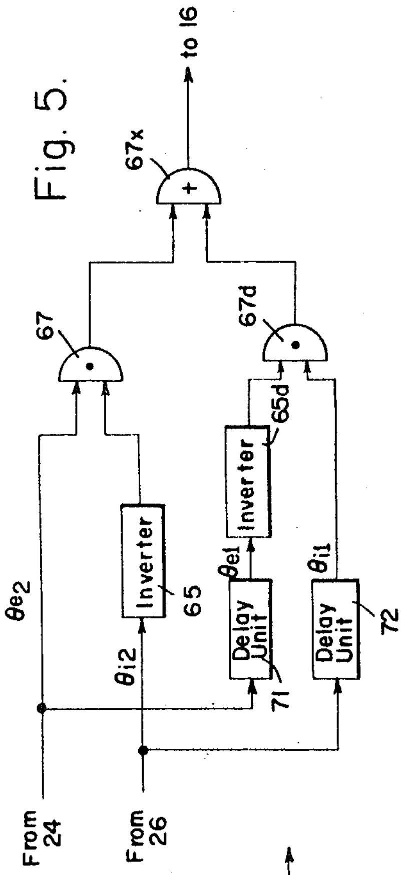
Fig. 5.
| $\theta e1$ | $\theta e2$ | $\theta i1$ | $\theta i2$ | 67 | 67a | 67x |
|---|---|---|---|---|---|---|
| 0 | 0 | 0 | 0 | 0 | 0 | 0 |
| 0 | 0 | 0 | 1 | 0 | 0 | 0 |
| 0 | 0 | 1 | 0 | 0 | 1 | 1 |
| 0 | 0 | 1 | 1 | 0 | 1 | 1 |
| 0 | 1 | 0 | 0 | 1 | 0 | 1 |
| 0 | 1 | 0 | 1 | 0 | 0 | 0 |
| 0 | 1 | 1 | 0 | 1 | 1 | 1 |
| 0 | 1 | 1 | 1 | 0 | 1 | 1 |
| 1 | 0 | 0 | 0 | 0 | 0 | 0 |
| 1 | 0 | 0 | 1 | 0 | 0 | 0 |
| 1 | 0 | 1 | 0 | 0 | 0 | 0 |
| 1 | 0 | 1 | 1 | 0 | 0 | 0 |
| 1 | 1 | 0 | 0 | 1 | 0 | 1 |
| 1 | 1 | 0 | 1 | 0 | 0 | 0 |
| 1 | 1 | 1 | 0 | 1 | 0 | 1 |
| 1 | 1 | 1 | 1 | 0 | 0 | 0 |
Fig. 6.
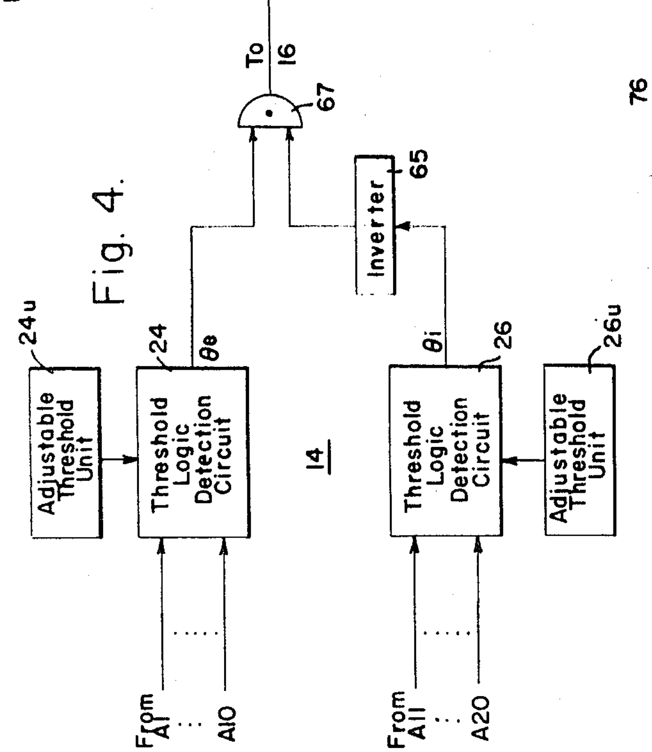
Fig. 4.
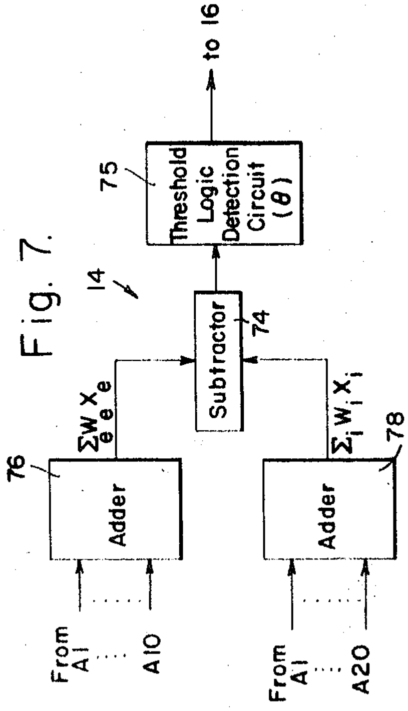
Fig. 7.

United States Patent Office 3,457,552
Patented July 22, 1969

3,457,552
ADAPTIVE SELF-ORGANIZING PATTERN RECOGNIZING SYSTEM

Robert H. Asendorf, Woodland Hills, Calif., assignor to Hughes Aircraft Company, Culver City, Calif., a corporation of Delaware Filed Oct. 24, 1966, Ser. No. 589,096
Int. Cl. G06f 7/34, 7/22
U.S. Cl. 340—172.5 16 Claims

ABSTRACT OF THE DISCLOSURE

An adaptive pattern recognition system including an input field having an array of sensors randomly connected to a sampler which further randomly samples the sensed information to generate pulse signals in response thereto. An associate field, including at least two threshold detectors, is coupled to receive the sampled information signals and generates an output pulse when a first threshold level (excitory) is exceeded, but not when a second threshold level (inhibitory) is also exceeded. The signals from the associate field are fed to a recognition field where they are stored and subsequently compared with signals corresponding to subsequently sensed information. The number of coincidences between the signals stored can be increased or decreased in a reward/punish operation.

This invention relates to a pattern recognizing system and, more particularly, to a self-organizing system, adaptable to learn to recognize patterns.

In the new field of learning machines, several systems have been developed in recent years which are capable of being trained or adapted to recognize or classify patterns on the basis of past experiences. Briefly, each such adaptive system may be regarded as consisting of three distinct subsystems or fields. These are the input or sensory field, the association field, and the output or response field.

Generally, the input field consists of a relatively large number of sensory elements such as photocells which provide signals in response to a pattern sensed thereby. The association field consists of many interconnected adaptive logic elements which provide output signals as a function of the signals supplied thereto from the photocells of the sensory field. Typically, the logic elements are threshold circuits in which the threshold level, above which an output signal is produced, is adjustable. Thus, the elements may be thought of as adaptive. The output or response field of the machine, like the association field, is composed of adaptive logic elements.

The adaptive or self-learning behavior of the system is derived from the overall modification of the responses of the individual logical elements. These responses are modified, during the training of the system, to recognize known patterns so that each known pattern produces an output signal unique thereto. Recognition of an unknown pattern is accomplished by a trained system when the unknown pattern produces an output signal related to one of the unique signals associated with a known pattern.

It is appreciated by those familiar with the art that the ease or difficulty with which such systems can be trained to recognize unique patterns, is directly related to the ease or difficulty with which the responses of the various logical elements can be modified, so that different patterns, though closely similar, produce different distinguishable output signals. Also, it is appreciated that a major goal in designing such a system is to be able to increase the number of recognizable patterns without excessively increasing the number of logical elements and interconnections which result in increased complexity, cost and difficulty of maintaining the system in operative condition.

It is therefore a primary object of the present invention to provide a new adaptive self-organizing pattern recognizing system.

Another object is to provide a relatively simple adaptive self-learing system in which the training of the system is conveniently accomplishable.

A further object is the provision of a system for recognizing patterns on the basis of pretaught patterns wth a relatively moderate number of response-adjustable logic elements.

Still a further object is to provide a new self-learning system which is easily controllable to provide, in response to unique, though highly similar patterns, unique signals for identifying any one of a significant number of input patterns.

Yet a further object is to provide a new adaptive self-organizing system, controllable to provide a unique sequence of signals in response to a unique sequence of patterns which the system is trained to recognize, with each signal or signals in the sequence being related to a subsequent pattern in the sequence of patterns.

These and other objects are achieved by providing a system in which sensing elements, such as photocells, responsive to an input pattern, are randomly interconnected and scanned by a pseudorandom pattern generator. The outputs of the cells are combined in at least one threshold logic detection circuit to provide a series or sequence of output signals. The outputs of the photocells, supplied to the detection circuit, may be arranged so that all photocell output signals are additive which, when exceeding an adjustable threshold level, result in an output of the detection circuit. Such photocell output signals may be thought of as excitory signals.

Also the detection circuit may be operated to respond to photocell output signals, representing inhibitory signals, which inhibit or negate the response of the threshold logic detection circuit to the excitory signals. In such an arrangement, only when the added excitory signals exceed the threshold level plus the added inhibitory signals, does the detection circuit provide an output which forms a part of the output sequence. Other inter-connections between threshold detection circuitry and excitory and inhibitory signals are realizable in accordance with the teachings of the invention to be described hereafter in detail.

As a result of scanning the randomly connected sensory elements with the pseudorandom pattern generator, a sequence of output signals or simply outputs is provided from the detection circuitry, which is unique to each pattern sensed by the sensory elements. By recording or storing each sequence of outputs and later comparing it with a sequence of outputs provided by an unidentified pattern, the latter pattern may be recognized if the sequence produced thereby relates to a sequence representing a known pattern.

The system of the present invention includes an arrangement whereby during the training period, the sequences of outputs, representing known patterns, are modified, hereafter also referred to as being rewarded or punished, to minimize the possibility of erroneous identification of an unknown pattern. Alternately stated, during the training period, the sequence of outputs representing known patterns are subject to modification to insure that each sequence is unique to a particular pattern. Thus, when an unknown pattern produces such a sequence or one closely similar thereto, the unknown pattern may be identified with a higher degree of accuracy. In accordance with the teachings of the present invention, reward and punishment techniques are employed, in the training period, so that the machine produces a unique sequence of patterns which the machine is trained to recognize. Each output in the sequence may also be thought of as indicating the next pattern in the sequence.

The novel features that are considered characteristic of this invention are set forth with particularity in the appended claims. The invention will best be understood from the following description when read in connection with the accompanying drawings, in which:

FIGURES 2 and 3 are block diagrams of the input field 12, shown in FIGURE 1;

FIGURES 4 and 5 are block diagrams of two different embodiments of the association field;

FIGURE 6 is a truth table useful in explaining the arrangement of FIGURE 5;

Figure 13:
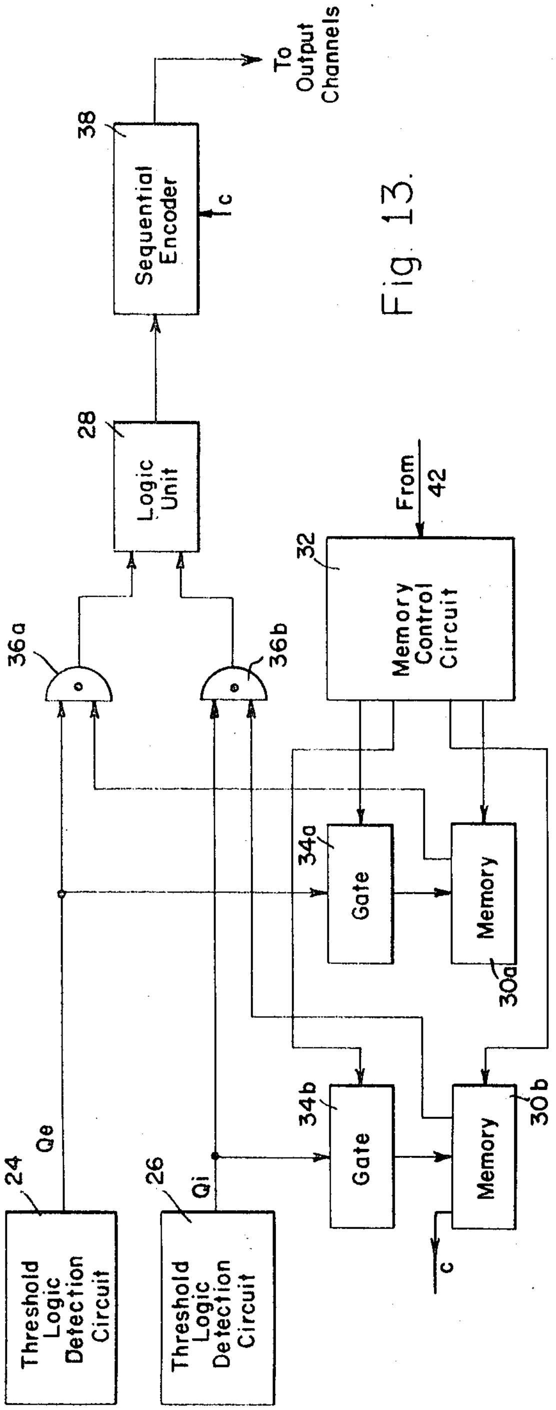
Figure 7A:
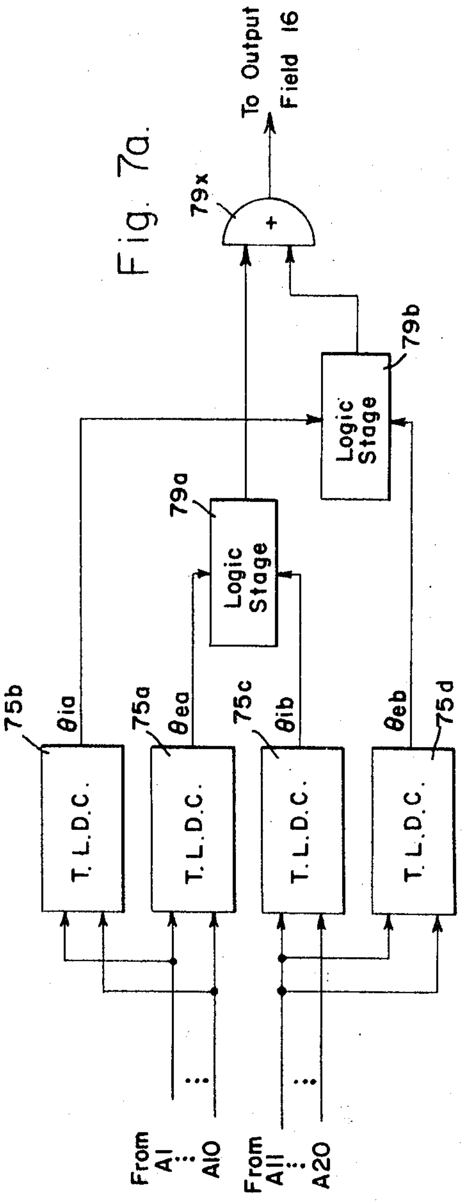
Figures 8, 9, 10:
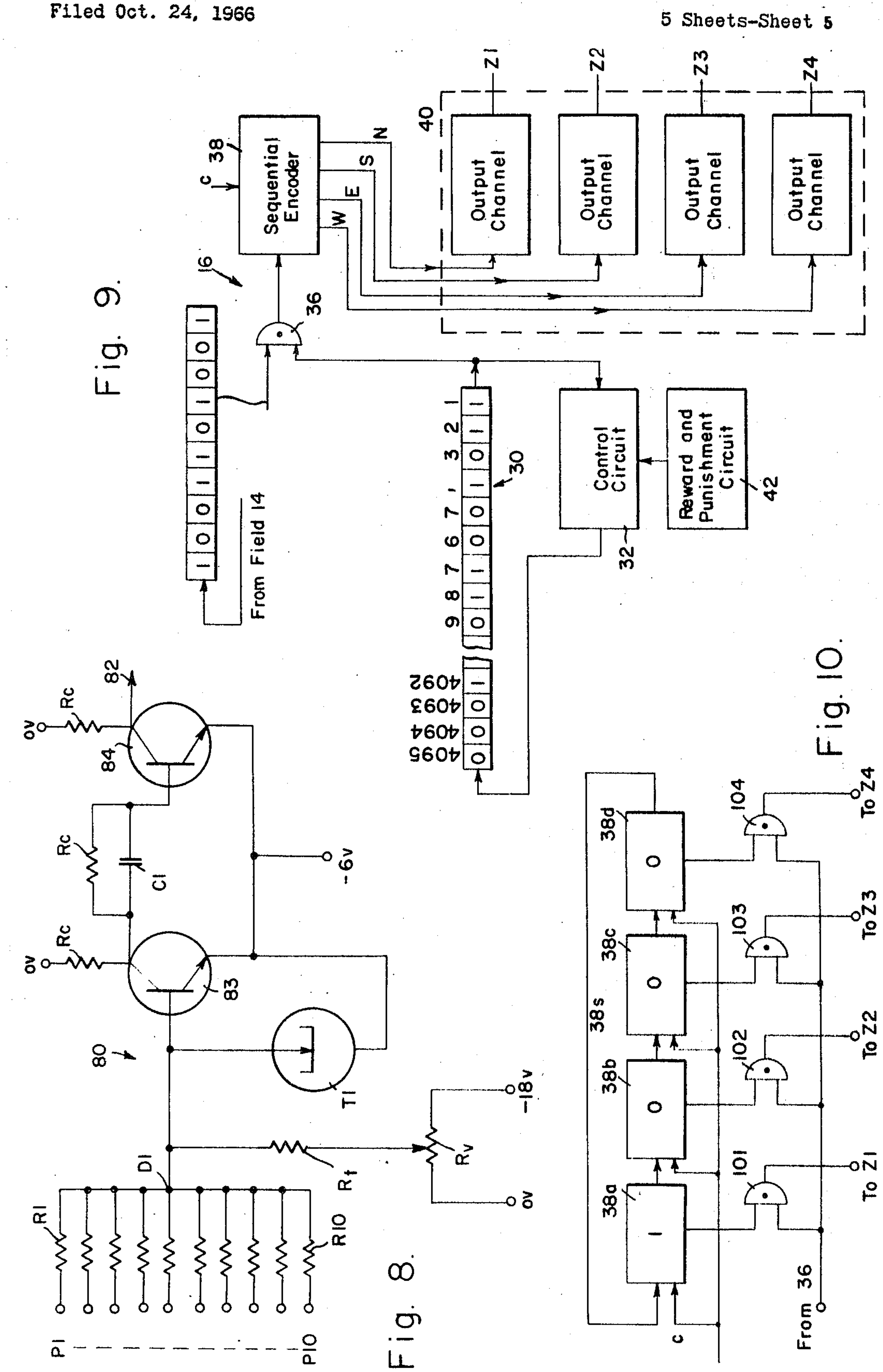

FIGURES 7 and 7*a* are block diagrams of additional embodiments of the association field;

FIGURE 8 is a schematic diagram of a threshold logic detection circuit;

FIGURE 9 is a block diagram of one embodiment of the output field;

FIGURE 10 is a block diagram of one embodiment of a sequential encoder;

FIGURES 11 and 12 are diagrams useful in explaining the operation of the present invention in recognizing a sequence of patterns; and FIGURE 13 is a partial block diagram of another embodiment of the present invention.

Figure 1:
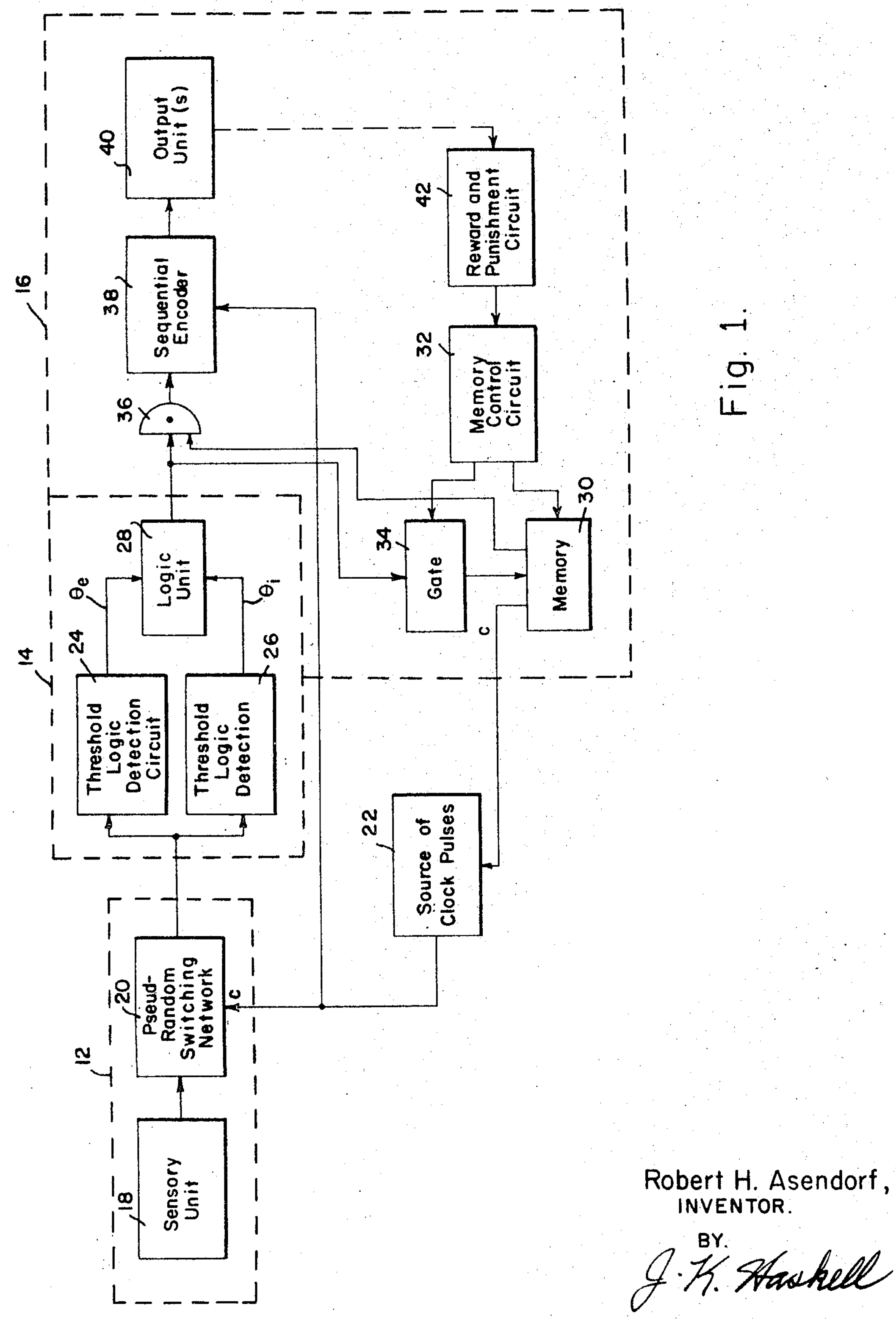
FIGURE 1 is a general block diagram of the present invention.

Reference is now made to FIGURE 1 which is a simplified overall block diagram of an embodiment of the novel adaptive self-learning system of the present invention. Therein, the input, association, and output or response fields, hereinbefore referred to, are generally designated by reference numerals 12, 14, and 16, respectively. The input field is shown comprising of sensory units 18, which may consist of a plurality of photocells, arranged in a preselected matrix to provide output signals to a suitable random switching network 20 in response to a pattern sensed by the sensory units. Within the network 20, the output signals of the various sensory units are interconnected and statistically scanned at a rate controlled by pulses *c*, from a source of clock pulses or timer 22. During each pulse time interval defined by the time between successive *c* pulses, the association field 14 is provided with a set of signals from network 20, indicating the response of the sensory unit 18 to the pattern sensed thereby as a function of the particular switching or scanning state of network 20 during that particular pulse interval.

The set of signals from the input field 12 is supplied to the association field 14, which in different embodiments of the present invention comprises different numbers of differently interconnected threshold logic detection circuits. In the embodiment diagrammed in FIGURE 1, the association field 14 is shown comprising of threshold logic detection circuits 24 and 26, each receiving a different portion of the set of signals from the input field 12, in a manner to be described hereafter in detail. Each of the detection circuits also includes an adjustable threshold level, so that only when the sum of the input signals thereto exceeds the adjusted threshold level, does the detection circuit provide an output signal. In FIGURE 1, the outputs of detection circuits 24 and 26, designated $\theta_a$ and $\theta_i$ respectively, are shown supplied to a logic unit 28, the function of which is to supply an output signal only when the signal $\theta_a$ is greater than $\theta_i$, which is the output signal of detection circuit 26. The output of unit 28 represents the output of the association field 14 which is supplied to the output or response field 16.

The number of threshold logic detection circuits included in the association field 14 depends on the particular association employed, as will be described hereinafter in greater detail, as well as on the particular technique of scanning the input field 12. When scanning is sequentially produced over a scanning cycle of a preselected number of pulse time intervals, such as N intervals, the output of input field 12 will comprise N sets of output signals, each set supplied to the association field during another one of the N pulse time intervals. In such an arrangement, the output of the association field will in turn comprise N output signals, which, in accordance with the teachings of the present invention, are binary signals. That is, each of the N output signals of the association field is either a binary one (1) or a binary zero (0), depending on the binary output of unit 28. Thus, in such an arrangement, the complete scanning of the sensory unit 18, in response to a pattern, results in a series or sequence of N binary output signals of the association field 14, which is supplied to the output or response field 16.

As seen from FIGURE 1, the response field 16 comprises a memory 30 controlled by a memory control circuit 32, and connected to the output of unit 28 representing the output of the association field 14, through a gate 34. The output of the memory 30 and the output of the association field 14 are connected to two inputs of an AND gate 36. The output of gate 36 may be connected directly to one or more output units, generally designated by reference numeral 40 or through sequential encoder 38.

Briefly described, the function of memory 30 is to store each sequence of output signals from the association field 14, representing another pattern which the machine is taught to recognize. Then, during a succeeding scanning cycle of the same pattern, the outputs of the association field and that of the memory are supplied to AND gate 36 to provide a series of binary "1's" and "0's." These may be supplied to one output unit 40, wherein either the "1's" or "0's" are counted up so that the numerical value or number is indicative of the particular pattern that the machine or system is taught to recognize. When using the encoder 38, different portions of the sequence of "1's" and "0's" from gate 36 are supplied to different output units, each counting the "1's" or "0's" supplied thereto.

The memory 30 may be thought of as comprising a plurality of multibit fields or words, each designated to store a sequence of output signals of the association field 14 in response to another pattern that the system is taught to recognize. For example, let us assume that in response to a pattern of the letter E which the system is to recognize, the input field 12 is sequentially scanned during a cycle of N pulse intervals, resulting in an output of the association field 14 comprising N binary signals which include, for explanatory purposes, 180 "1's," dispersed among N–180 "0's" in a particular sequence, unique for the pattern E. In accordance with the teachings of the invention, the sequence of outputs, representing the pattern E, hereafter also referred to as the E sequence, is stored in a word in memory 30 designated for storing the E sequence therein. Then, during a succeeding scanning cycle of the pattern E, it is appreciated that during 180 pulse intervals, the inputs to AND gate 36 will be binary "1's" resulting in binary "1" ouput signals therefrom. These are then supplied to an output unit 40, associated with the particular pattern E to be recognized, wherein a count equal to 180 is accumulated. Similarly, the system is operable to recognize other patterns such as the letter F, storing an F sequence in another word in memory 30 which, when read out during a succeeding scanning cycle of the F pattern, results in a different numerical readout to which the F sequence is supplied. The output of unit or units 40 represents the output of output field 16.

The preliminary adaptation or training of the system is accomplished by adjusting the threshold levels of the detection circuits in the association field 14 so that in response to each particular known pattern, the output field 16 provides a unique numerical value which, when produced by an unknown pattern, is used to associate the unknown pattern with the particular pattern providing the particular numerical value. Thus, in the foregoing example, assuming that the number 180 provided by output unit 40 represents an E, then when any unknown pattern is sensed by the sensory unit 18, providing an output of 180, the unknown pattern may be assumed to be that of the letter E.

From an embodiment of the novel system of the invention, actually reduced to practice, it has been found that by adjusting the threshold levels in the association field 14, the system may be trained to identify each of a plurality of input patterns on the basis of the numerical value produced by the output field in response to each one of the patterns. Prior to identifying the patterns, each one of them was scanned by the sensory unit 18, during the training period, and a sequence related thereto stored in a memory 30. The stored sequences were then compared with the sequence of output signals provided by each of the unkown patterns, with the numerical output of field 16 used to relate the unkown pattern to one of the known patterns providing a similar numerical output. Such a technique was used in employing the system to identify alphabetic symbols by comparing the numerical output produced by an unknown symbol with the known numerical outputs produced by each one of known twenty-six alphabetic symbols.

Although such a system has been found to operate quite successfully, it is appreciated that highly related, though different patterns, may produce similar numerical outputs, and therefore distinguishing or properly identifying the patterns may be difficult. Such difficulty, for example, arises when attempting to statistically separate between two symbols such as E and F. In order to minimize the danger that patterns are erroneously identified, in accordance with the teachings of the present invention, a reward and punishment circuit 42 is employed to control the memory control circuit 32 which in turn is assumed to control the memory 30. Circuit 42 may be assumed to include a reward circuit and a punishment circuit. Briefly, the reward circuit is used to increase the number of "1's" in the memory word associated with any known pattern, while when using the punishment circuit, the number of "1's" in any memory word is reduced. To minimize the danger of erroneous identification of patterns, the punishment circuit in circuit 42 is utilized to modify the content of the memory words where each word represents a sequence of outputs generated by another known pattern, so that when each word is correlated or compared with the sequence of pulses produced by a scanned pattern other than the pattern associated therewith, a minimum numerical output is produced.

As herebefore described, let it be assumed that the memory word associated with pattern E includes 180 "1's" so that when the letter E is scanned, the output of unit 40 is 180. Let it further be assumed that when such a memory word is compared with a sequence of output signals from association field 14, in response to scanning the letter F, the output of unit 40 is 25, resulting from the similarity between the characters E and F. Such a numerical output may be analogized to a committee of 180 experts in recognizing the letter E among whom 25 experts may confuse the letter E with the letter F. In order to minimize the number of experts which may confuse the two letters or patterns, in accordance with the teachings of the present invention, during the training period of the system, the punishment circuit of circuit 42 is used to modify the memory word associated with the letter E, reducing the number of "1's" therein, so that when the modified memory word E is used in conjunction with a scanned letter F, the output of unit 40 is minimized. This is analogous to stating that the committee of 180 experts in recognizing the letter E is reduced in size to minimize the number of experts thereon which may confuse the letter E with another letter such as F. Such a technique has been found to be most powerful in minimizing the danger of erroneous identification of patterns.

Attention is now directed to FIGURE 2 which is a simplified diagram of the input field 12. As seen therefrom, the input field includes the sensory units or elements, such as photocells 18, arranged in a predetermined matrix, to form a sensory field 19 on which a pattern, such as the letter E, is overlayed. Each of the elements provides an output signal as a function of the portion of the pattern sensed thereby. In FIGURE 2, the output signals of all the sensory elements, comprising the sensory field 19, are designated by arrows 50*a* through 50*n*, respectively. It is appreciated that the number of output signals is equal to the number of sensory elements, comprising the input or sensory field. These output signals are supplied to a logic and a scanning network 55, the function of which is to combine the output signals of the sensory elements into sets of signals designated by arrows 57*a* through 57*i*, respectively. Each set of signals from network 55 represents the output of another combination of interconnected sensory elements 18. The sets of signals from the network 55 represent the output of the sensory field 12, which is supplied to the association field 14.

One embodiment of the logic and scanning network 55, actually reduced to practice, is diagrammed in FIGURE 3, to which reference is made herein. In this embodiment, the sensory field 19 comprised of 100 sensory elements 18, the output signals of which were connected to twenty OR gates, four of which, designated $O_1$ ,$O_2$, $O_{19}$ and $O_{20}$, are shown in FIGURE 3. Each of the OR gates is shown having five input terminals and a single output terminal. The outputs of the various sensory elements may be directly connected to the OR gates or through statistical switches, with five sensory elements being connected to each one of the gates. The output of each of the OR gates is connected to one input of another AND gate, four of which are shown in FIGURE 3, designated by A1, A2, A19, and A20 respectively. The outputs of the twenty AND gates represent a set of signals supplied to the association field 14.

The other input terminal to each of the AND gates is connected to another bit of a multibit shift register 61 which, together with a mod-2 adder 62, forms a digital pseudorandom pattern generator 63. As is appreciated by those familiar with the art, generator 63 which may include more than one mod-2 adder, generates a pseudorandom sequence of "0's" and "1's." The shift register 61 is stepped by the clock pulses, generally designated by C, provided from the source of clock pulses 22 (FIGURE 1), so that during each clock pulse interval, a different sequence or pattern of "0's" and "1's" is present in the shift register. The patterns generated in this way are all distinct and will not repeat until the major cycle has been completed. Assuming that register 61 is of N bits, the major cycle is of $2^N-1$ clock pulses long. In the embodiment of the invention being described, the twenty AND gates A1 through A20 were connected to bits of a 12-bit register so that the pattern cycle was $2^{12}-1$ or 4,095 clock pulses long. Hereafter, the major cycle will also be referred to as the scanning cycle.

From the foregoing description, it should be appreciated by those familiar with the art that during each clock pulse interval, whether a given AND gate provides an output signal, depends on the binary state of the shift register bit to which it is connected, as well as to the output of the other gate connected to the other input terminal thereof. For example, during the clock pulse interval diagrammed in FIGURE 3, it is appreciated that since AND gates A2 and A19 are connected to bits of the shift register assumed to be in a binary "0" state, such gates will provide a binary "0" output, irrespective of the signals supplied thereto from OR gates $O_2$ and $O_{19}$, respectively. On the other hand, AND gates A1 and A20, shown connected to shift register bits assumed to be in a binary "1" state, may provide binary "1" outputs, depending on the binary signals supplied thereto from OR gates $O_1$ and $O_{20}$ respectively which, in turn, depend on the signals supplied thereto from sensory element 18. Thus, during each clock pulse interval, a unique set of twenty signals is supplied by the outputs of AND gates A1 through A20, which is a function of the particular digital pattern in the scanning cycle, as well as the particular combination of sensory elements connected to the plurality of OR gates.

It should further be appreciated that when employing the digital pseudorandom pattern generator 63, the AND gates (A1 through A20) provide a different set of signals during each clock pulse interval, thus providing 4,095 sets of signals to the association field 14 during a complete scanning cycle. It should be appreciated, however, that by greatly increasing the number of logic elements in a network 50, all the sets of signals may be simultaneously supplied to an association field 14 sufficiently large to relate all the sets of signals coincidently in time. Hereafter, for explanatory purposes only, the novel teachings of the present invention will be described in conjunction with serial mode of operation in which the sets of signals from the input field 12 are supplied to the association field 14 in sequence or during a seiies of 4,095 clock pulse intervals.

The association field 14 may briefly be described as a circuit providing a binary output as a function of the set of signals supplied thereto and an adjustable threshold level. The association field 14 may include one or more threshold logic detection circuits, each with an adjustable threshold level. Each circuit may respond to all or a portion of the signals in each set of signals supplied from the input field. Each detection circuit provides a binary output such as a binary "1" only when the signals supplied thereto exceed a selected threshold level. When the association field 14 includes more than one detection circuit, the binary outputs of the various circuits are combined to provide a single binary output signal as a function of the signal relationship therebetween.

Attention is now directed to FIGURE 4 which is a block diagram of one embodiment of an association field, actually reduced to practice. It is shown comprising two threshold logic detection circuits 24 and 26, shown in FIGURE 1, each having a threshold level, adjustable by means of an adjustable threshold unit 24U and 26U respectively. Circuit 24 is shown supplied with the output of one-half of the set of signals from the input field, such as the outputs of AND gates A1 through A10, while the circuit 26 is supplied with the other half of the set of signals from AND gates A11 through A20. Each detection circuit provides a binary output representing a binary "1" only when the ten signals supplied thereto exceed the threshold level provided by its respective adjustable threshold unit. Arbitrarily, the output of threshold logic detection circuit 24 is assumed to represent an excitory output, designated by $\theta_e$, while the output of detection circuit 26 is assumed to represent an inhibitory output designated by $\theta_i$. In the particular embodiment, the binary output of detection circuit $\theta_i$ is supplied to a binary inverter 65, the output of which is supplied to one input of an AND gate 67. The other input of AND gate 67 is connected to the output, $\theta_e$, of detection circuit 24. The inverter 65 and AND gate 67, together comprise the logic circuit 28, diagrammed in FIGURE 1.

As should be appreciated from the particular logic interconnections, if the threshold level in detection circuit 26 is exceeded by any combination of the ten input signals supplied thereto, its output is a binary "1," resulting in a binary "0" output of inverter 65 which in turn results in a binary "0" output of AND gate 67. This binary "0" output is irrespective of the binary output $\theta_e$ of detection circuit 24. However, when the output of detection circuit 26 is a binary "0," the output of the inverter 65 is a binary "1." Therefore, the output of AND gate 67 depends on the binary output of detection circuit 24, being a binary "1" when $\theta_e$ is a binary "1" and a binary "0" when $\theta_e$ is a binary "0." From the foregoing, it is thus seen that whether the output of AND gate 67 representing the output of the association field 14 is a binary "1" or a binary "0," depends on the binary characteristics of the set of signals supplied from the input field, as well as the threshold levels supplied to detection circuits 24 and 26 from their respective adjustable threshold units 24U and 26U respectively. For any given setting of the threshold levels, supplied to the two detection circuits, the association field 14 provides an output which is either a binary "0" or a binary "1," depending on the particular set of signals supplied thereto. Thus, when the association field is supplied with a sequence of 4,095 different sets of signals, the output of AND gate 67 forms a sequence of 4,095 binary signals which are either binary "1's" or binary "0's," generated during the complete scanning cycle.

In the arrangement shown in FIGURE 4, the output of AND gate 67 is a function of the signals in a single set of signals supplied to the association field 14 during a single clock pulse interval. The signals from AND gates A11 through A20 supplied to detection circuit 26 only serve to inhibit the production of a binary "1" output of AND gate 67, since they are used in the detection circuit 26 which, when providing a binary "1" output, results in the supply of a binary "0" signal to one of the inputs of AND gate 67, which in turn produces a binary "0" output therefrom. It has been found that the sensitivity of the association field 14 may be enhanced by using the various signals in each set of signals for both excitory and inhibitory functions, without substantially increasing the size and complexity of the association field. This may be accomplished by producing an output of the association field which is a function of the signals in two sets of signals, produced during two discrete clock pulse intervals, with the signals being utilized for both excitory and inhibitory purposes.

For a better understanding of such an arrangement, reference is made to FIGURE 5, wherein inverter 65 and AND gate 67 are shown directly connected to the detection circuits 24 and 26 in a manner identical to that diagrammed in FIGURE 4. However, in addition, the outputs of detection circuits 24 and 26, designated by $\theta_e$ and $\theta_i$ respectively are supplied to delay units 71 and 72 respectively. The output of delay unit 71 is supplied to one input of an AND gate **67*d* through an inverter 65*d*, while the output of delay unit 72 is directly connected to another input of AND gate 67*d*. The outputs of AND gates 67 and 67*d* are respectively connected to different inputs of an OR gate 67X, the output of which represents the output of the association field 14**.

The delay units 71 and 72 are identical in that each provides a time delay equal to an integer number of clock pulse intervals. Thus, whereas the signals supplied to AND gate 67 are those produced by the detection circuits 24 and 26 at a given clock pulse interval, the signals supplied to AND gate **67*d* actually represent the output of the same detection circuits provided during an earlier clock pulse interval. For explanatory purposes, let us assume that the time delay produced by units 71 and 72 is equal to two clock pulse intervals. Let it further be assumed that the output of detection circuit 24 during a first clock pulse interval is $\theta_{e1}$ and during two clock pulse intervals later is $\theta_{e2}$. Similarly, it is assumed that the output of detection circuit 26 during the first clock pulse interval is $\theta_{i1}$ and during the later clock pulse interval is $\theta_{i2}$. Then from FIGURE 5, it may be seen that during these subsequent clock pulse intervals, AND gate 67 provides a binary "1" output only if $\theta_{e2}$ is a "1" and $\theta_{i2}$ is a "0," while AND gate 67*d* provides a binary "1" output only if during the earlier clock pulse interval, $\theta_{e1}$ was a "0" and $\theta_{i1}$ was a binary "1." The output of gate 67X, representing the output of the association field 14, is a function of the sets of signals supplied to the threshold detection circuits 24 and 26** during either of two discrete time intervals, whereby the signals during one clock pulse interval used for excitory purposes, are later employed to perform inhibitory functions, while those signals used during the earlier clock pulse interval for inhibitory purposes are employed during the subsequent clock pulse interval for excitory functions.

The operation of the logic circuitry diagrammed in FIGURE 5 may be summarized in chart form, known as a truth table, shown in FIGURE 6 to which reference is made herein. As seen therefrom, the output of gate 67X, being represented by the righthand column, is a binary "1" when the output of either gate 67 or **67*d*** is a binary "1."

In another embodiment of the association field 14 diagrammed in block form in FIGURE 7, to which reference is made herein, the association field comprises a single threshold logic detection circuit 75 which provides a binary output signal to the output field 16 only when an input signal supplied thereto from a subtractor 74 exceeds an adjustable threshold level in circuit 75. The output of subtractor 74 may be an analog signal which represents the difference between the signals from AND gates A1 to A10 added in an adder 76 and the signals from AND gates A11 through A20 added in another adder 78. Representing the signals added in adder 76 as $X_e$, where the subscript $e$ represents that the signals perform an excitory function and the signals added in adder 78 as $X_i$, the $i$ indicating an inhibitory function and furthermore designating the adjustable threshold level in detection circuit 75 by $\theta$, the output signal of detection circuit 75 designated $X_0$ can be expressed by the signum function as follows:

$$X_0=\text{signum }[\Sigma W_e X_e-\Sigma W_i X_i-\theta] \qquad (1)$$

where $W_e$ and $W_i$ are non-negative weighting functions, used to provide different weights to the different signals, supplied to the two adder circuits. The output of the signum function is either +1 or −1; as a matter of convenience, this may be interpreted as either a binary "1" or a binary "0." Thus, whereas in the previously described embodiment of the association circuit 14, each detection circuit, such as circuits 24 and 26, shown in FIGURE 4, is supplied with signals which are assumed to perform either an excitory or an inhibitory function, the detection circuit 75 (FIGURE 7) is provided with a signal from subtractor 74 which is an output representing the combined effect of the signals assumed to represent excitory and inhibitory functions.

In still another embodiment of the invention, diagrammed in FIGURE 7*a*, the signals from AND gates A1 through A10 are supplied to two threshold logic detection circuits (TLDC) **75*a* and 75*b* which provide respective outputs $\theta_{ea}$ and $\theta_{ia}$. Similarly, the outputs of AND gates A11 through A20 are supplied to two threshold logic detection circuits 75*c* and 75*d*, the outputs of which are designated respectively $\theta_{ib}$ and $\theta_{eb}$. The outputs of circuits 75*a* and 75*c* are combined in a logic stage 79*a*, which includes an inverter and AND gate, performing functions identical to those performed by inverter 65 and AND gate 67 shown in FIGURE 4. Thus, the output of logic stage 79*a* is a binary "1" only when the output $\theta_{ib}$ is a "0" and the output $\theta_{ea}$ of circuit 75*a* is a binary "1." In such an arrangement, the outputs of gates A11 through A20 perform an inhibitory function, while the outputs of gates A1 through A10 perform an excitory function. Similarly, the outputs of circiuts 75*b* and 75*d* are combined in a logic stage 79*b*, which is identical with stage 79*a*. The output of stage 79*b* is a binary "1" only when the output of circuit 75*b* is a binary "0" and the output of circuit 75*d* is a binary "1." Consequently, from the point of view of the output of stage 79*b*, the signals from gates A11 through A20 perform an excitory function, while the signals from gates A1 through A10 perform an inhibitory function. The outputs of stages 79*a* and 79*b* are supplied to an OR gate 79*x*, the output of which represents the output of the association field 14**.

Although it is appreciated that different threshold logic detection circuitry may be employed to implement a threshold logic detection circuit to practice the teachings of the present invention, a circuit, schematically diagrammed in FIGURE 8, has been found to be most versatile and useful in conjunction with the present invention, providing a high degree of flexibility and ease of adjustment of the threshold levels hereinbefore referred to. Briefly, the detection circuit 80 has ten input terminals designated P1 through P10, and a single output terminal designated by numeral 82. A variable resistor $R_V$ provides an adjustable analog threshold level in a manner to be explained hereafter. Each of the input terminals is connected to the output of another one of the AND gates shown in FIGURE 3, such as AND gates A1 through A10, so that when the output of the particular AND gate is a binary "1," the input terminal is connected to a first reference potential such as −6 volts, while being connected to another reference potential such as ground when the output of the particular AND gate is a binary "0."

Input terminals P1 through P10 are connected to a common input point D1 through resistors R1 through R10 respectively. The voltage at point D1 is a function of the digital signals at the plurality of the input terminals P1 through P10. The resistors R1 through R10 may be of different resistive values to provide different weighting factors to the input signals. The resistors provide a passive resistive summing network, also known as a Khirkoff Adder for providing a summation of the ten digital input signals. The detection circuit 80 also includes a tunnel diode T1, having its anode connected to the junction point D1 and to the base of a transistor 83, the emitter of which is connected together with the cathode of tunnel diode T1 to a reference potential such as a −6 volts. The collector of transistor 83 is connected through a resistor $R_C$ to another reference potential such as 0 volts or ground. The latter mentioned collector is also connected to a base of a transistor 84, through parallelly connected capacitor C1 and resistor $R_C$, with the emitter of transistor 84 being connected to −6 volts and the collector thereof being connected to the output terminal 82 and to ground potential, through another resistor $R_C$. The adjustable threshold level is provided by a transistor 83 is conducting while transistor 84 is in its nontion point D1 and the other end to the movable arm of a variable resistor $R_V$, the end terminals of which are connected to the ground potential and to another reference potential such as −18 volts. By adjusting the position of the movable arm of resistor $R_V$, the threshold level is adjusted.

As is well known in the art, a tunnel diode is a bistable element which is switchable between first and second stable states of operation, often referred to as the low voltage high current state and the high voltage low current state. When tunnel diode T1 is in its low voltage high current state, the base of transistor 83 is only slightly above −6 volts and therefore transistor 83 is in its nonconductive state. Consequently, the collector thereof, as well as the base of transistor 84, are at ground potential. As a result, transistor 84 is in its conductive state so that the collector thereof, as well as the output terminal 82 connected thereto, are assumed to be at nearly −6 volts, representing a binary "1." On the other hand, when tunnel diode T1 is in its high voltage low current state, transistor 83 is conducting while transistor 84 is in its nonconductive or cutoff state. Consequently, the collector thereof, as well as the output terminal 82, are substantially at ground potential, representing a binary "0."

The switching threshold of the tunnel diode T1 from one state to another is controlled by the setting of the variable resistor $R_V$, while the actual switching is controlled by the summation at junction point D1 as a function of the digital signals at input terminals P1 through P10. The circuit hereinbefore described has been found to be most advantageous since a tunnel diode is switchable at a very high speed, with the switching requiring a few picoseconds. Also, the switching threshold point is sharply defined and the amount of energy, required to effect switching, is much smaller than that required for other more conventional switching circuits. In addition, the tunnel diode switching circuit has been found to be very stable.

Summarizing the foregoing description, the novel system of the present invention includes a plurality of sensory elements which define a sensory field on which a pattern to be recognized is superimposed. The sensory elements provide output signals in response to the sensed pattern. The outputs of randomly chosen sensory elements are interconnected in a plurality of logic elements such as OR gates $O_1$ through $O_{20}$ (FIGURE 3), the outputs of which are scanned to provide sets of output signals, each set representing the response to the sensed pattern of a different combination of sensory elements. The signals of each set, comprising the output of an input field, are supplied to an association field, wherein they are associated or analyzed in threshold detection circuitry. The signals in each set are divided to perform excitory and/or inhibitory functions so that only when one or more adjustable threshold levels are exceeded by different combinations of signals, is a binary "1" output signal produced by the association field. Otherwise, a binary "0" signal is supplied therefrom. The association field may further be operated to provide a binary output signal which is a function of signals of more than one set, such as has been described in conjunction with FIGURES 5 and 6.

However, irrespective of the mode of operation of the association field, the output thereof is a group of binary signals, comprising an output sequence of "1's" and "0's." Such a group is characteristic of the particular pattern sensed by the sensory elements, and is used to identify or recognize patterns producing a similar binary group. It should be appreciated that when the sets of signals supplied to the association field are sequentially generated, such as by means of the digital pseudorandom pattern generator 63, hereinbefore described in conjunction with FIGURE 3, the group of binary outputs of the association field is sequentially produced. However, as hereinbefore indicated, with a sufficiently large number of logic elements, all the sets of signals characteristic of a particular pattern may be coincidentally generated, so that an association field with a sufficiently large number of threshold circuits may provide the entire group of binary output signals coincidentally in time.

The group or sequence of binary signals from the association field is supplied to the output field, wherein it is compared or correlated by means of gate 36 (FIGURE 1) with signals stored in the memory 30 to provide an output indicative of the sensed pattern. The content of the memory for each known pattern may be modified in order to minimize the output of the output field 16 when the content of the known pattern is compared or correlated with a sequence produced by any pattern other than a pattern identical thereto. For example, as previously pointed out, a word in a memory 30, associated with the letter E, may be modified by reducing the number of "1's" therein so that when the memory word E is compared or correlated with a sequence of binary signals from the association field 14, produced in response to sensing any other pattern than the letter E, the output of output field 16 is zero or a minimum. As a result, when a sequence of binary signals from the association field 14, provided in response to scanning an unknown pattern, is compared with the memory word E and a significant output is produced, the unknown pattern may be safely determined to be the letter E.

Reducing the number of "1's" in the memory word E is accomplished by means of the reward and punishment circuit 42. As previously stated, the latter circuit may be though of as comprising a reward circuit and a punishment circuit. The function of the reward circuit is simply to increase the number of "1's" in any of the memory words in memory 30 while the punishment circuit is to reduce the number of ones therein. Since many techniques are presently known in the art for writing data into memory words, it is appreciated that the circuits necessary to modify the memory words may comprise of different logic circuit arrangements adapted to the particular memory utilized. For example, the reward and punishment circuit 42 may include a manually operated switch which, upon being actuated, may trigger a monostable multivibrator to produce a pulse of a predetermined duration during which either "1's" or "0's" are stored in one of the memory words transferred into a write register (not shown) in a manner well known in the art, so that the desired binary signals may be written thereinto during the predetermined period of time.

The ability to modify the content of each memory word, associated with a known pattern, is most significant in that it enhances the capability of the system disclosed herein to distinguish between patterns which need not be located on a specific portion of the sensory field 19 (FIGURE 2) but rather may be located in any desired orientation thereon. For example, a memory word associated with a letter X, hereafter also referred to as memory word X, may be rewarded during the training period of the system to provide a relatively large output when the letter X is positioned in any of a plurality of different positions on the sensory field 19, while punishing or reducing the number of "1's" stored in the memory word X when another letter, such as for example the letter L, is placed in different positions on the sensory field 19. If necessary, the threshold level or levels in the association field 14 may be adjusted to insure that the memory word X includes a sufficient number of "1's" which do not correlate with "1's" in the sequence produced by sensing the letter L so that the system is capable of providing an output indicative of the X.

In another embodiment of the present invention, the output field 16 may include a plurality of output channels which display numerical output signals, which hereafter may be referred to simply as outputs. These outputs are utilized to control the content of the memory so that in response to each of a sequence of sensed patterns, the outputs in the plurality of output channels are indicative of a subsequent pattern in the pattern sequence. Thus, the system of the present invention is not limited to recognize individual patterns and provide output signals in response thereto, but is also capable of relating a plurality of patterns successively sensed thereby.

For a better understanding of the latter aspect of the present invention, reference is made to FIGURE 9 which is a simplified block diagram of another embodiment of the output field 16. In FIGURE 9, memory 30 is represented by a multibit circulating shift register or delay line, providing sufficient delay so that 4,095 bits may be stored therein. The sequence of binary signals supplied from the association field in response to sensing each pattern is also assumed to comprise 4,095 bits. The output of memory 30, as well as the sequence from the association field 14, are supplied to the AND gate 36 which is connected to a plurality of output channels Z1 through Z4 through the sequential encoder 38. Channels Z1 through Z4 correspond to output unit 40 in FIGURE 1. As herebefore described, the function of gate 36 is to provide during each time interval an output which relates to two binary signals supplied thereto. The gate provides a binary "1" output whenever the two binary signals supplied thereto are binary "1's." The function of the sequential encoder 38 is to sequentially provide the binary output of gate 36 to the plurality of output channels. Gate 36 may be thought of as comparing or correlating the two binary signal sequences supplied thereto bit by bit, while the function of encoder 38 is to divide the output of gate 36 between the four output channels. Encoder 38 may be operated to supply to output channel Z1, the results of the correlation of bits 1, 5, 9 . . . 4,092 in the two binary signal sequences, while the results of the correlation of bits 2, 6, 10 . . . 4,093 are supplied to output channel Z2. Similarly, the results of the correlation of bits 3, 7 . . . 4,094 are supplied to output channel Z3 while the correlation of bits 4, 8 . . . 4,095 are supplied to the last output channel Z4.

One embodiment of the sequential encoder 38 is diagrammed in FIGURE 10, to which reference is made herein. The encoder includes a circulating shift register 38*s*, comprising four bits designated 38*a* through 38*d*. During each time interval, a "1" is stored in one of the bits, while "0's" are stored in the other three bits. As seen from FIGURE 10, bits 38*a* through 38*d* are each connected to one input of AND gates 101 through 104 respectively, while the other input of each of the gates is connected to the output of AND gate 36. The outputs of gates 101 through 104 are connected to output channels Z1 through Z4 respectively. During any time interval, only one of the shift register bits stores a binary "1" and therefore only one of the four AND gates 101 through 104 is provided with a binary "1" signal from the register. As a result, only one of the output channels may be supplied with a binary "1" signal, depending on the binary signal received from AND gate 36. In the arrangement shown in FIGURE 10, if the signal from gate 36 is a binary "1," gate 101 is enabled, thereby supplying a binary "1" signal to output channel Z1. During a subsequent time interval, gate 102 may be enabled, depending on the signal from gate 36.

From the foregoing, it is thus seen that by employing an output field as diagrammed in FIGURE 9, a plurality of outputs may be provided by a plurality of output channels, where the output in each channel represents the correlation between different portions of the two binary signal sequences, one sequence being provided by memory 30 and the other one by the association field in response to a sensed pattern. The plurality of outputs may be utilized either manually or automatically to reward and/or punish the content of the sequence in memory 30 so that in response to each sensed pattern, the plurality of outputs are indicative of a subsequent pattern which is to be sensed in a sequence of sensed patterns.

For a better understanding of the latter described aspect of the present invention, reference is made to FIGURE 11 which is a simple diagram representing a plurality of pattern segments designated X1 through X10, where each pattern in the sequence is an extension of the preceding pattern thereof. Thus, the patterns may be thought of as comprising segments X1, X1+X2, X1+X2+X3, etc. Defining the output channels Z1 through Z4 as representing North, South, East, and West respectively, the sytsem of the present invention may be operated so that in response to sensing a pattern represented by X1 only, which is assumed to be the first in the sequence of patterns, the outputs in the four output channels are controlled so that the output in channel Z1, representing North, is the largest, thereby indicating that the succeeding pattern in the sequence is one which will include a segment extending Northward of the presently sensed pattern X1. That is, the next pattern is one comprising of segments X1+X2.

Controlling output channel Z1 to have the largest output is accomplished by rewarding, by means of a reward circuit in the reward and punishment circuit 42, the bits in memory 30 associated with output channel Z1. The rewarding is achieved by writing binary "1's" into some of the bits 1, 5, 9 through 4,092 so that the output of output channel Z1 is the largest of the four output channels. Thereafter, the pattern displayed on the sensory field 19 (FIGURE 1) includes pattern portions X1+X2. The output of the four output channels are again observed and controlled by means of reward and punishment circuit 42 so that the output of output channel Z1 is again the largest, thereby indicating that the succeeding pattern is one which includes a segment extending Northward of the presently sensed pattern, i.e. a pattern comprising of X1+X2+X3.

The content of the memory is constantly modified as each succeeding pattern is displayed. For example, after displaying pattern comprising segments X1 through X4, it is seen from FIGURE 11 that the succeeding pattern segment, i.e. X5, is to the right or Eastward of X4. Thus, when displaying a pattern including portions X1 through X4, the content of memory 30 is adjusted by rewarding and punishing different portions thereof so that the output of output channel Z3, representing East, is a maximum. When displaying the pattern including X1 through X6, it is again desired that the output of output channel Z1 be the largest since the subsequent pattern segment X7 is to the North of X6.

The process of modifying the content of memory 30 is continued for each succeeding pattern until the complete pattern sequence is sensed. Thereafter, it may be necessary to repeat this operation several times since succeeding modifications may affect the performance of the machine for preceding pattern displays. However, after several runs, the content of memory 30 can be modified so that the outputs of the plurality of output channels in response to the sensing of each one of the patterns is indicative of the succeeding pattern in the sequence. Thus, the system may be adapted to recognize each of the patterns in the sequence and provide signals indicative of the next related pattern.

In adapting the system to produce outputs, in response to each pattern in a sequence, indicative of a succeeding pattern, a situation may arise where rewarding and punishing the content of the memory would be insufficient to produce the desired results, because of the particular sequences of binary signals which the association field provides to gate 36 in response to the sensing of the various patterns in the sequence. In such a case, the operator may vary the setting of the various threshold levels in the association field until the sequences of signals, provided in response to the various sensed elements, can be correlated with the content in the memory so that the outputs produced in response to each sensed pattern are indicative of the next pattern in the sequence.

The system's adaptation process to respond properly to each of the patterns shown in FIGURE 11 is summarized in chart form in FIGURE 12, to which reference is made herein. The chart displays the channel which is to have a maximum output in response to each pattern in the sequence. It is appreciated that maximizing the output of any channel may be accomplished by rewarding; that is, increasing the number of "1's" in the bits associated therewith and/or punishing, i.e. reducing the number of "1's" in the bits associated with the other channels. Therefore, the rewarding and punishing may be generalized by referring to modifying the content of the memory which is assumed to mean rewarding and/or punishing any portions of the memory content.

From the foregoing, it should be appreciated that the system of the present invention, in addition to providing outputs such that each output is indicative of another pattern, as well as provide outputs which represent specific patterns on the sensory field, is also capable of relating patterns which form a part of a pattern sequence, such as that diagrammed in FIGURE 11. Regarding the patterns in FIGURE 11 as a maze, the novel system herebefore described is capable of being adapted or taught to provide outputs in response to each position or segment of the maze which are indicative of the next segment of the maze. Thus, the system may be thought of as one which is adapted to automatically navigate through the maze.

Herebefore, it has been assumed that rewarding and punishing is performed on a memory word consisting of the output of the association field 14. Such an arrangement is diagrammed in FIGURE 1 as well as in FIGURE 9.

However, the invention need not be limited thereto. Rather, reward and punishment techniques may be employed, within the association field 14, on the separate outputs of the threshold logic detection circuits providing the excitory or inhibitory outputs. For example, the outputs of threshold logic detection circuits 24 and 26 (FIGURE 4), designated $\theta_e$ and $\theta_i$, may be separately rewarded or punished to produce two modified binary sequences, one related to the excitory output signals of circuit 24 and the other to the inhibitory outputs of detection circuit 26. These modified binary sequences may then be stored in two separate memory arrangements and, thereafter, combined to produce a single binary sequence, comprising the output of the association field 14.

For a better understanding of such an arrangement, reference is made to FIGURE 13, wherein the output of threshold logic detection circuit 24 (FIGURE 1) is shown supplied to a memory 30*a* through a gate 34*a* as well as to one input of an AND gate 36*a*. The other input of gate 36*a* is connected to memory 30*a*, which is controlled, together with gate 34*a*, by the memory control circuit 32 which is in turn controllable by the reward and punishment circuit 42 in a manner similar to that hereinbefore described in conjunction with FIGURE 1. Similarly, the output of threshold logic detection circuit 26, designated $\theta_i$, and representing inhibitory signals, is connected to a memory 30*b* through a gate 34*b*, as well as to one input of an AND gate 36*b*, the other input of which is connected to the output of memory 30*b*.

Memory arrangements 30*a* and 30*b* may independently be controlled by circuit 32 to store modified binary sequences, representing the outputs of detection circuits 24 and 26, respectively. Thereafter, the modified sequences may be correlated with the outputs of the two detection circuits in gates 36*a* and 36*b* and supplied to the logic unit 28, the output of which represents the output of the association field 14. As hereinbefore described, logic unit 28 may comprise an inverter and an AND gate such as inverter 65 and AND gate 67, showin in FIGURE 4. The output of unit 28 is shown supplied to the sequential encoder 38 which, as hereinbefore described, supplies different portions of the binary sequence, representing the output of the association field 14, to different ones of the output channels, such as Z1 through Z4, so that the combined outputs of the output channels may be used to relate each of a plurality of patterns in a sequence of patterns.

There has accordingly been shown and described herein a novel adaptive pattern recognizing system which can be self-organized to respond to one pattern and provide an output related thereto as well as respond to each pattern in sequence. It is appreciated that those familiar with the art may make modifications in the arrangements as shown without departing from the true spirit of the invention. Therefore, all such modifications and/or equivalents are deemed to fall within the scope of the invention as claimed in the appended claims.

What is claimed is:

1. An adaptive pattern recognizing system comprising:

an input field including a plurality of sensors, each providing a binary "1" signal at an output terminal thereof, in response to a portion of a pattern sensed thereby, and a binary "0" signal in the absence of sensing a pattern portion;

a first plurality of gates, each having a plurality of input terminals and an output terminal for providing a binary "1" output signal as a function of a preselected number of binary "1" signals at the input terminals thereof;

means randomly connecting the output terminals of said sensors to the input terminals of said first plurality of gates, with the output terminal of each sensor connected to at least the input terminal of one gate;

means coupled to the output terminals of said first plurality of gates, including means for scanning in a preselected sequence, the output signals of said first plurality of gates to provide a sequence of sets of binary signals, representing the output of said input field, each set being the signals from another combination of sensors in response to sensing said pattern:

an association field including first and second threshold detection means, each including an adjustable threshold level, said first threshold detection means being responsive to one half of each set of binary signals from said input field to provide a binary "1" signal, representing an excitory signal, when the signals supplied thereto exceed the adjustable threshold level thereof, said second threshold detection means being responsive to the other half of each set of binary signals to provide a binary "1" signal, representing an inhibitory signal, when the signals supplied thereto exceed the adjustable threshold level thereof, and logic means responsive to the signals from said first and second threshold detection means for providing a binary "1" output signal when the signal from said first threshold detection means is a binary "1" signal and the signal from said second threshold detection means is a binary signal other than a binary "1" signal; and output means coupled to said association field for utilizing the sequence of binary signals provided thereby, to provide an output indicative of said sensed pattern.

2. The system defined in claim 1 wherein said association field includes first, second, third, and fourth threshold detection means, each including an adjustable threshold level, said first and second threshold detection means being responsive to one half of a set of binary signals from said input field for providing respective binary "1" or binary "0" output signals, when the signals supplied thereto exceed or are below the threshold levels thereof, said third and fourth threshold detection means being responsive to the other half of each set of binary signals from said input field for providing respective binary "1" or binary "0" output signals when the signals supplied thereto exceed or are below their respective threshold levels;

first logic means responsive to the output signals of said first and third threshold detection means to provide a binary "1" signal when the signals from said first and third threshold detection means are a binary "1" and a binary "0" respectively;

second logic means responsive to the output signals of said second and fourth threshold detection means to provide a binary "1" signal when the signals from said second and fourth threshold detection means are a binary "0" and a binary "1" respectively; and means connected to said first and second logic means for providing a binary "1" output signal when at least one of said logic means provides a binary "1" output signal.

3. The system defined in claim 2 wherein said output means includes storing means for storing the sequence of binary signals from said association field; and means for correlating the sequence of binary signals stored in said storing means with a subsequently supplied sequence of binary signals from said association field in response to the sensing of a pattern to be recognized, to provide an output indicative of the relation of the pattern to be recognized with the pattern, providing the sequence of binary signals stored in said storing means, said output means including means for modifying the sequence of binary signals stored in said storing means.

4. The system defined in claim 3 wherein said output means includes a plurality of output channels, and a digital encoder, coupled to said means for correlating and said plurality of output channels, to supply to each output channel, signals indicative of the correlation between a different portion of the two sequences of binary signals correlated by said means for correlating, each output channel providing an output related to the number of signals supplied thereto, whereby the outputs of said output channels are indicative of a sensed pattern or a subsequent pattern in a sequence of sensed patterns.

5. The system defined in claim 1 wherein said output means includes storing means for storing the sequence of binary signals from said association field; and means for correlating the sequence of binary signals stored in said storing means with a subsequently supplied sequence of binary signals from said association field, in response to the sensing of a pattern to be recognized, to provide an output indicative of the relation of the pattern to be recognized with the pattern providing the sequence of binary signals stored in said storing means, said output means including means for modifying the sequence of binary signals stored in said storing means.

6. The system defined in claim 5 wherein said output means includes a plurality of output channels, and a digital encoder coupling said means for correlating and said plurality of output channels to supply to each output channel signals indicative of the correlation between a different portion of the two sequences of binary signals correlated by said means for correlating, each output channel providing an output related to the number of signals supplied thereto, whereby the outputs of said output channels are indicative of a sensed pattern or a subsequent pattern in a sequence of sensed patterns.

7. The system defined in claim 1 wherein said association field includes first and second threshold detection means, each including an adjustable threshold level and responsive to a different portion of each set of binary signals from said input field forming said sequence of set of binary signals, to provide first and second sequences of binary output signals respectively, the output signal being a binary "1" when the binary signals supplied to the threshold detection means exceed the adjustable threshold level thereof, said output means including first and second storing means, respectively storing the first and second sequences of the binary output signals;

means for independently modifying each of the stored sequences of the binary output signals; and means for correlating the modified stored first and second sequences of the binary output signals with subsequently supplied sequences of binary output signals from said first and second threshold detection means to provide a third sequence of binary output signals to said output means.

8. The system defined in claim 7 wherein said output means includes at least one output channel providing a numerical output indicative of the number of binary "1" output signals in said third sequence.

9. The system defined in claim 1 wherein the gates of said first plurality of gates are OR gates and said means for scanning include $i$ AND gates each having an output terminal and two input terminals and a pseudorandom generator, including a multibit shift register, for providing a unique sequence of $x$ bits, means connecting the output terminal of each OR gate to one input terminal of one of the AND gates and each bit of said shift register to the other input terminal of at least one of said AND gates, whereby the binary output signals of said $i$ AND gates comprise a set of $i$ binary signals, during each bit of said $x$ bit sequence of said shift register, to provide $x$ sets of $i$ binary signals, representing the output of said input field, and said association field includes at least first and second threshold detection means each including an adjustable threshold level, said first threshold detection means being responsive to one half of each set of binary signals to provide a binary "1" signal representing an excitory signal when the signals supplied thereto exceed the adjustable threshold level thereof and said second threshold detection means being responsive to the other half of each set of binary signals to provide a binary "1" signal representing an inhibitory signal when the signals supplied thereto exceed the adjustable threshold level thereof, and logic means responsive to the signals from said first and second threshold detection means for providing a binary "1" output signal when the signal from said first threshold detection means is a binary "1" signal and the signal from said second threshold detection means is a binary signal other than a binary "1" signal.

10. The system defined in claim 9 wherein said output means includes a plurality of output channels, and a digital encoder coupling said means for correlating and said plurality of output channels to supply to each output channel signals indicative of the correlation between a different portion of the two sequences of binary signals correlated by said means for correlating, each output channel providing an output related to the number of signals supplied thereto, whereby the outputs of said output channels are indicative of a sensed pattern or a subsequent pattern in a sequence of sensed patterns.

11. In a pattern recognition system, an improvement comprising:

sensor means having a plurality of sensors, each adapted to sense a discrete area within a plane;

sampler means coupled to said sensor means for randomly sampling the plurality of sensor means and generating sampled information signals corresponding to sensed random patterns;

means coupled to said sampler means for receiving the randomly sampled signals and generating a first signal when a first plurality of the received sampled information signals exceeds a first threshold level and generating a second signal when a second plurality of the received sampled information signals exceeds a second threshold level; and means coupled to receive the first signal and the second signal for generating an output signal upon occurrence of the first signal and noncoincidence of the second signal.

12. The pattern recognition system of claim 11 in which said means coupled to said sampler means includes means for adjustably setting the first threshold level, and means for adjustably setting the second threshold level.

13. The system of claim 11 in which said sampler means is coupled to said sensor means in a random pattern and is further operable to randomly sample the plurality of sensor means in a repetitive pattern.

14. The system of claim 12 in which said sampler means is coupled to said sensor means in a random pattern and is further operable to randomly sample the plurality of sensor means in a repetitive pattern.

15. The pattern recognition system of claim 11, further including:

storage means selectively coupled to receive output signals from the last said means for storing the signals, said storage means being further operable to read out the stored information during subsequent time intervals for comparing the stored information with subsequently sensed information; and reward-punish means coupled to said storage means and to receive the output signals and being operable during predetermined time intervals for reducing the number of coincident ONES signals when the number of comparisons exceeds a selected number, and for increasing the number of ONES when the number of comparisons is less than a selected number.

16. In a pattern recognition system, an improvement comprising:

means adapted to sense a plurality of discrete areas of an information field in a random sample pattern for generating excitory signals when a first predetermined number of areas is simultaneously sampled and for generating inhibitory signals when a second predetermined number of areas is simultaneously sampled, said means producing an output signal upon noncoincidence between the excitory signal and the inhibitory signal;

storage means selectively coupled to reecive output signals from the last said means for storing the signals, said storage means being further operable to read out the stored information during subsequent time intervals for comparing the stored information with output signals corresponding to subsequently sensed information; and reward-punish means coupled to said storage means and being operable during predetermined time intervals for reducing the number of coincident ONES signals when the number of comparisons exceeds a selected number, and for increasing the number of ONES when the number of comparisons is less than a selected predetermined number.

References Cited

UNITED STATES PATENTS

| | | | |
|---|---|---|---|
| 3,341,814 | 9/1967 | Chao Kong Chow | 340—146.3 |
| 3,319,229 | 5/1967 | Fuhr et al. | 340—172.5 |
| 3,311,895 | 3/1967 | Clapper | 340—172.5 |
| 3,267,439 | 8/1966 | Bonner | 340—172.5 |
| 3,267,431 | 881966 | Greenberg et al. | 340—146.3 |
| 3,255,436 | 6/1966 | Gamba | 340—146.3 |
| 3,022,005 | 2/1962 | Dickinson | 235—152 |

GARETH D. SHAW, Primary Examiner

U.S. Cl. X.R.

340—146.3

PO-1050
(5/69)

UNITED STATES PATENT OFFICE
CERTIFICATE OF CORRECTION

Patent No. 3,457,552 Dated July 22, 1969

Inventor(s) ROBERT H. ASENDORF

It is certified that error appears in the above-identified patent and that said Letters Patent are hereby corrected as shown below:

Col. 2, line 65, "sequence" should be --sequences--.
Col. 10, line 36, delete "a" after "as";
line 45, "transistor 83 is conducting while transistor 84 is in its non-" should be --resistor $R_t$, having one end thereof connected to the junc- --.
Col. 11, line 75, "though" should be --thought--.
Col. 12, line 48, "recognize" should be --recognizing--.
Col. 15, line 39, "showin" should be --shown--;
line 50, after "in" should be --a--.

SIGNED AND
SEALED
APR 28 1970

(SEAL)
Attest:

Edward M. Fletcher, Jr.
Attesting Officer

WILLIAM E. SCHUYLER, JR.
Commissioner of Patents